June 6, 1967  J. BASSANO  3,323,227
DRYING APPARATUS FOR MACARONI AND THE LIKE
Original Filed March 18, 1963  2 Sheets-Sheet 1
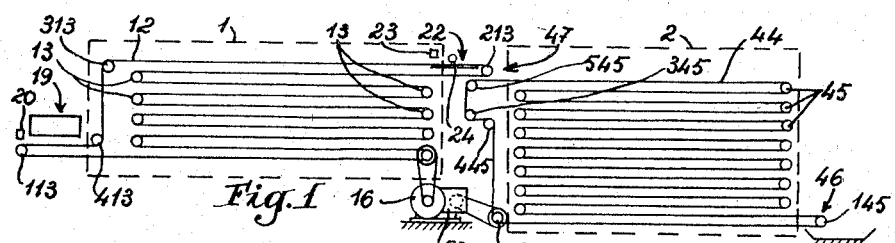
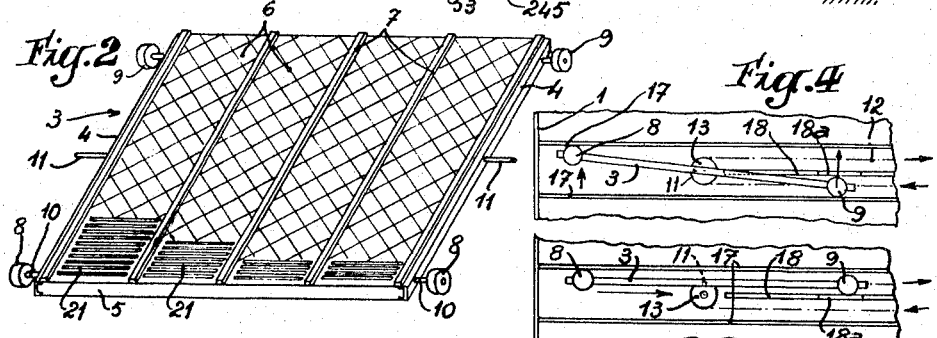
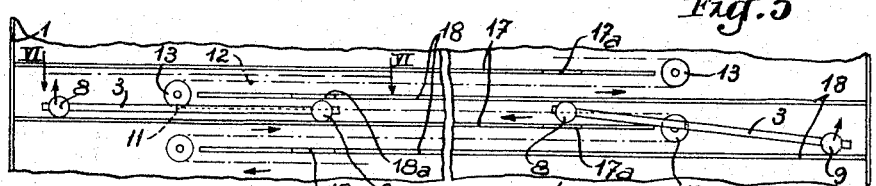
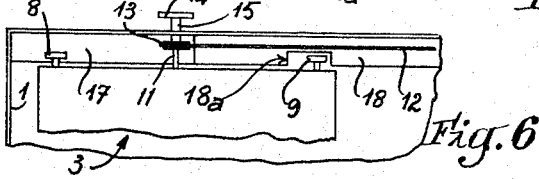
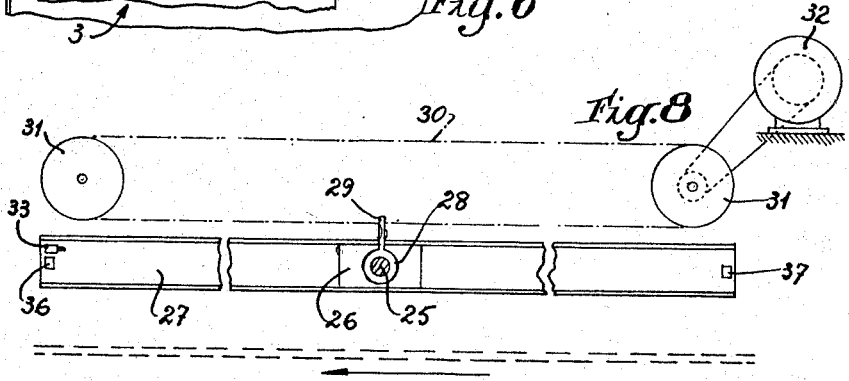
INVENTOR
Joseph Bassano
BY
ATTORNEY

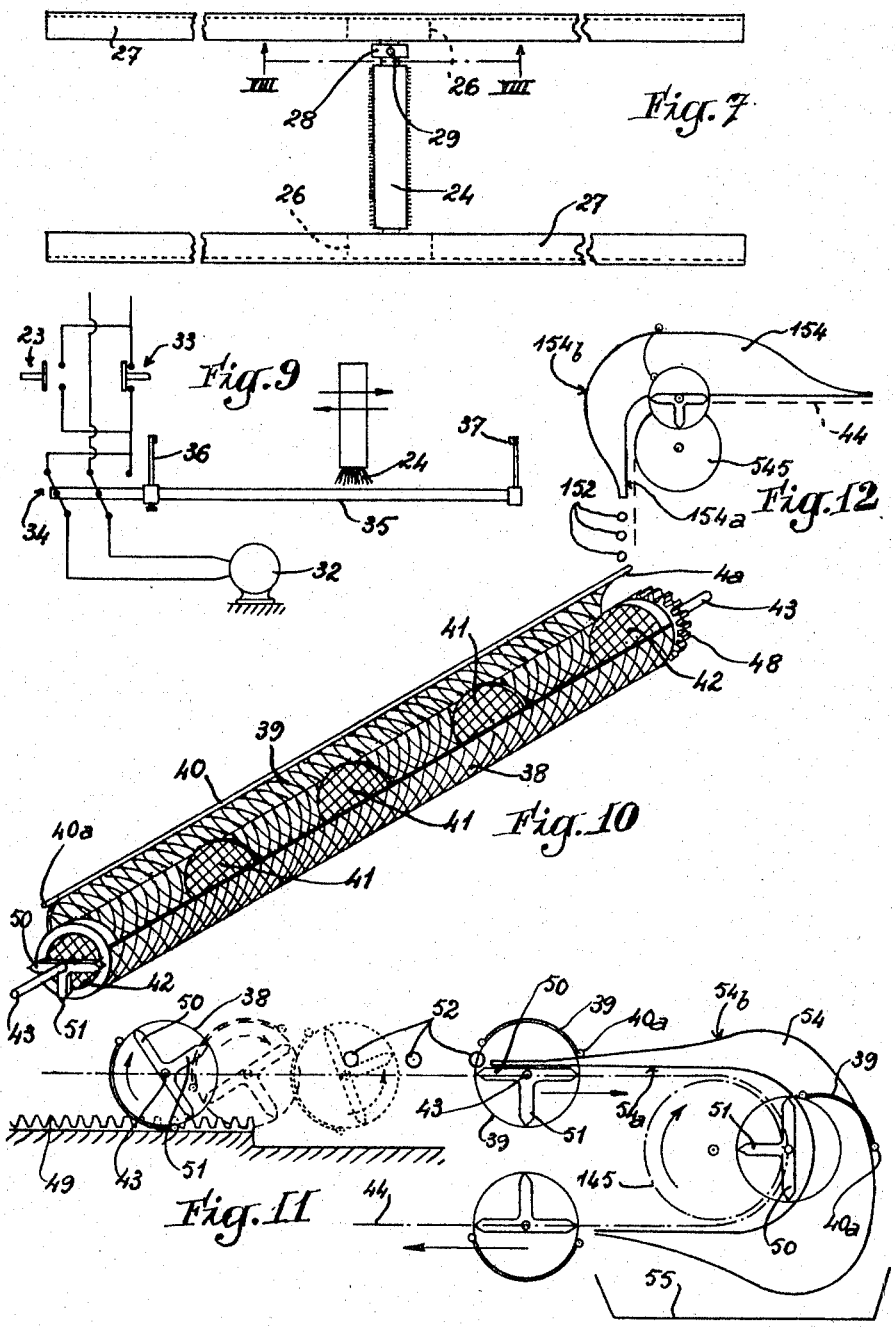

United States Patent Office

3,323,227
Patented June 6, 1967

3,323,227
DRYING APPARATUS FOR MACARONI
AND THE LIKE
Joseph Bassano, Ave. Jean Jaures,
St.-Didier-Au-Mont-D'Or, France
Original application Mar. 18, 1963, Ser. No. 265,688.
Divided and this application May 4, 1966, Ser. No.
558,183
Claims priority, application France, Mar. 27, 1962,
42,440
6 Claims. (Cl. 34—203)

This is a division of application Ser. No. 265,688, filed Mar. 18, 1963, now abandoned.

This invention relates to the drying of Italian paste products of substantial length such as macaroni, and it has for its object to provide a method and apparatus whereby the said products may be dried under their final form, i.e., after they have been cut to the desired length.

In accordance with the present invention the products are first pre-dried, preferably on movable perforated pre-drying supports or screens, and they are thereafter enclosed in elongated cylindrical cages which are rolled within a final hot air drying chamber. The pre-drying step causes a marked hardening of the products which therefore retain their substantially straight shape in the cages during the final drying step in spite of the rolling and tumbling movements to which they are submitted within the cages. Owing to these movements the whole surface of each individual product is regularly submitted to the action of the drying air and the products are finally dried in a quite uniform manner.

The invention further includes an apparatus for the carrying into practice of the above method, the said apparatus comprising movable pre-drying screens divided by appropriate longitudinal partitions into a number of parallel transverse compartments each adapted to receive a predetermined quantity of products to be treated disposed in substantially parallel formation, transversely to the partitions, the said pre-drying screens conveying the products through a pre-drying chamber, and elongated cylindrical drying cages the inner space of which is divided by transverse partitions into a number of compartments to respectively receive the pre-dried products from the compartments of one of the said pre-drying screens and to convey same through a final drying chamber. The pre-drying screens and the drying cages are provided with lateral pins which co-operate with lateral endless driving chains respectively provided in the pre-drying chamber and in the final drying chamber. Each cage further comprises a hinged arcuate cover and an end pinion adapted to mesh with a stationary lateral rack.

The pre-drying chamber comprises substantially horizontal rails to laterally support the movable pre-drying screens and means to cause each screen to pass from one pair of rails to the next one at the end of each of its horizontal strokes within the said pre-drying chamber.

Means are provided at the outlet of the pre-drying chamber and at the inlet of the final drying chamber to discharge the pre-dried products from the successive pre-drying screens into the successive drying cages, and at the outlet of the final drying chamber to discharge the dried products from the successive cages.

In the annexed drawings:

FIG. 1 is a quite diagrammatical side view showing a drying apparatus according to the present invention.

FIG. 2 is a perspective view of a pre-drying screen.

FIGS. 3 to 5 are fragmental side views of one of the inner walls of the pre-drying chamber illustrating the passage of a screen from one pair of rails to the next one within the said chamber.

FIG. 6 is a horizontal section taken along line VI–VI (FIG. 3).

FIG. 7 illustrates the arrangement of the brush device adapted to discharge the pre-dried products from the pre-drying screens.

FIG. 8 is a section taken along line VIII–VIII of FIG. 7.

FIG. 9 shows the electric wiring diagram associated to the arrangement of FIGS. 7 and 8.

FIG. 10 is a perspective view of a rotating cage.

FIG. 11 illustrates the arrangement of the discharging mechanism provided at the outlet of the final drying chamber of the apparatus.

FIG. 12 diagrammatically shows the loading mechanism provided at the inlet of the final drying chamber.

Referring to FIG. 1 the apparatus illustrated comprises two chambers 1 and 2, each associated with separate means, not illustrated, whereby air may be circulated through each chamber at the proper temperature and with the proper moisture content. Chamber 1 forms the pre-drying chamber in which the products are pre-dried and hardened before passing through chamber 2 which forms the final drying chamber.

The products are supported within the pre-drying chamber 1 by pre-drying screens 3 (FIG. 2) each comprising a substantially rigid rectangular frame formed of two lateral longitudinal members 4 and of two end cross-members 5. Frame 4–5 supports a grid or netting 6 made of wire or of plastic material, the upper side of which is divided into a number of compartments, namely four in the illustrated embodiment, by a plurality of longitudinal partitions in the form of bars 7 having their ends secured to cross-members 5. The width of the free space between two successive bars 7, is slightly greater than the length of the products to be treated. Frame 4–5 is supported by two pairs of rollers 8 and 9 rotatable on pins 10 which project laterally from the lateral longitudinal members 4, the rollers of each pair being substantially disposed along the same transverse axis. Each longitudinal member 4 further carries a transverse pin 11 which projects outwardly beyond rollers 8 and 9, these pins 11 being disposed on a common transverse axis which is slightly offset with respect to the transverse axis of symmetry of the screen, i.e., to the center of gravity thereof.

Pins 11 are secured to parallel endless chains 12 (FIGS. 1 and 3–6) carried and driven by toothed sprockets 13; as illustrated in FIG. 6 sprockets 13 may in turn be driven by sprockets 14 (FIG. 6) keyed on the shafts 15 on which sprockets 13 are mounted, the said shafts being passed through the lateral walls of chamber 1. Sprockets 14 are driven from a general motor 16 (FIG. 1) by suitable transmission means, not illustrated but forming no part of the present invention. Sprockets 13 are so mounted within chamber 1 as to determine for each chain 12 a zig-zag path formed of a superposition of horizontal runs alternately in one and the other direction, as clearly shown in FIG. 1. The screens 3 which follow chains 12 are guided horizontally by two series of superposed horizontal rails 17 and 18 (FIG. 3) on which their supporting rollers 8 and 9 roll alternately, rails 17 corresponding to the displacement from right to left in FIG. 3 and rails 18 to the displacement from left to right. The rails of each series start from one of the transverse walls of chamber 1 and terminate short of the other to leave the space required for mounting sprockets 13 and to permit passage of the screens 3 from one level to the next one, as this will be more fully explained hereinafter. At a small distance from the end of each rail which thus terminates short of the adjacent transverse wall the rail 17 or 18 is interrupted for a short distance, as indicated at 17a and 18a in FIGS. 3–5, this arrangement having for its purpose to permit passage of the rollers 8 or 9 which are at the rear of the successive screens 3 at the end of their stroke on the rails situated immediately below.

It will be appreciated that between two successive sprockets 13 of each lateral wall of chamber 1, each screen 3 follows a substantially horizontal path under the action of chains 12 which drive its lateral pins 11, rollers 8 and 9 rolling on rails 17 or 18. When pins 11 reach sprockets 13, they follow the periphery thereof and they therefore rise. Owing to the fact that the said pins are offset with respect to the center of gravity of the screen, the latter will therefore rock about the rollers 8 or 9 situated on the same side as the said center of gravity with respect to pins 11. In the example illustrated in FIGS. 3 to 5 pins 11 are disposed on the left of the center of gravity and therefore the screens will rock clockwise, as seen in FIG. 3, about the pair of rollers 9 which is situated on the right in the said figure, at either end of their successive strokes as this is clearly apparent in the drawing. The pair of rollers 8, which is situated on the left in FIG. 3 will therefore rise and engage the lower side of the next upper rails of the same series, for instance of the next upper rails 17 in the case of FIG. 4 wherein the screen was rolling towards the left on rails 17 before reaching the sprocket 13 illustrated, and then the rocking movement will now take place about rollers 8 and in the reverse direction, i.e., counterclockwise in FIGS. 3–5. The screen 3 has thus been raised from a pair of rails 17 to a pair of rails 18 (or from a pair of rails 18 to a pair of rails 17) and it again moves horizontally within chamber 1, but in the reverse direction, as clearly indicated by the arrows.

It will be observed that at the right-hand end of rails 17, interruptions 17a permit passage of rollers 8 during the first or clockwise rocking step of the successive screens (see FIG. 3 on the right), while at the left-hand end of rails 18 interruptions 18a permit passage of rollers 9 during the second or counterclockwise rocking step of the screens (see FIG. 4).

As indicated in FIG. 1 the lowermost run of chains 12 (together with the corresponding rails 17, 18, not illustrated) begins at the outside of chamber 1, or in other words the first pair of chain-supporting sprockets, which has been referenced 113 in FIG. 1 and which may be termed inlet sprockets, is mounted outside of the said chamber, at a distance from the left transverse wall thereof in FIG. 1. In the same manner the last pair of chain-supporting sprockets, or outlet sprockets 213, is situated outside of chamber 1, at a distance from the left transverse wall thereof. From this last pair of sprockets 213 chains 10 are returned horizontally to the left through chamber 1, they pass on sprockets 313 and are directed downwardly towards lower sprockets 413 from which they reach horizontally the inlet sprockets 113.

The loading station device 19, which may be of any suitable construction, is disposed on the last horizontal run of chains 12, immediately before the inlet sprockets 113. When a pre-drying screen 3 reaches the loading station 19, it cooperates with a feeler switch 20 which stops motor 16 for a short time. During this period of standstill of chains 12, the screen 3 at the loading station receives a pre-determined quantity of products to be dried; these products being arranged transversely with respect to the longitudinal compartments of the screen in the form of a substantially uniform layer 21 (these layers being only partly illustrated in FIG. 2).

The chains 12 being re-started, the loaded screen 3 is re-introduced into chamber 1 wherein it follows an ascending zig-zag path in the above-explained manner. It is to be observed that owing to the length of the screens, their inclination during their rocking movement at the end of each stroke, as illustrated in FIGS. 3 to 5 is small enough to insure that the products will not roll downwardly on their perforated supporting surface 6, taking into account the fact that this surface may be as rough as this may be suitable for this purpose. Owing to the passages of the successive screens 3 at the loading station 19 the movement of the chains, and therefore of the screens within chamber 1, is discontinuous or jerked, or in other words it comprises a succession of stop and starts.

Each screen finally reaches a discharging station 22 situated at the beginning of the last horizontal stroke, outside of chamber 1 and adjacent the outlet sprockets 213. The arrangement is such that this occurs when the endless chains 12 stop, i.e., just when another screen 3 reaches the loading station 19. A feeler switch 23 is momentarily actuated by the screen shortly before it stops at the discharging station 22, as for instance by one of the lateral pins 11 thereof, and this feeler switch causes operation of the brushing device illustrated in FIGS. 7 and 8.

This device comprises a brush 24 supported by a transverse bar 25 having its ends secured to blocks 26 slidably mounted in stationary U-shaped guiding rails 27. Rod 25 rigidly supports a collar 28 having an upwardly extending lug 29 the end of which is secured to a link of an endless chain 30 carried by two sprockets 31, one of which is driven by a motor 32. The circuit of motor 32 comprises (see FIG. 9) the normally open feeler switch 23 (actuated by the incoming screen), a normally closed switch contact 33 adapted to be actuated by brush 24 (or preferably by one of the blocks 26 which carry same, as indicated in FIG. 8), the said switch contact 33 being in parallel with feeler switch 23, and a reversing switch 34 actuated by a rod 35 having two stops or abutments 36 and 37 actuated by a block 26 respectively at one end and the other end of the stroke of brush 24.

At the position of rest brush 24 is at its extreme left-hand position in FIGS. 7–9. Switch contact 33 is therefore open and reversing switch 34 is set for displacement of brush 24 towards the right. When a screen 3 reaches the discharging station 22 it momentarily closes feeler switch 24, thus starting motor 32. Brush 24 therefore begins moving toward the right, thus liberating switch contact 33 which closes before feeler switch 23 re-opens. Brush 24 therefore continues its stroke towards the right and at the end thereof it (or more exactly one of its supporting blocks 26) actuates abutment 37 which reverses motor 32. Brush 24 therefore returns towards the right until it opens switch contact 33 which stops motor 32, since in the meanwhile feeler switch 23 has re-opened. It will be appreciated that during its stroke towards the right brush 24 sweeps the perforated surface 6 of the screen, thus causing the relatively hard pre-dried products to be discharged from the rear end of the screen.

The products thus discharged fall into a drying cage 38 which is at standstill at the proper position below the screen 3 under consideration with its cover fully open. Each cage 38 (FIG. 10) is formed of a perforated cylindrical wall having a length substantially equal to the width of the pre-drying screens 3, this wall having an opening which extends along the full length of the cage. This opening is normally closed by a hinged cover 39. Cover 39 is hinged to the perforated wall of the cage along a longitudinal edge of the opening thereof and it has an arcuate cross-section in such manner that at the closed position it completes the circular transverse contour of the cage. It is preferably itself perforated. Its free end has a longitudinal rod 40 having protruding ends 40a. It is urged towards its closed position by a torsional spring, not illustrated.

The inner space of each drying cage 38 is divided into a number of compartments equal to the number of compartments of the pre-drying screens 3 by circular inner partitions 41 and by two end walls 42. Each cage may thus receive in its compartments the pre-dried products from the respective compartments of each screen. Each end wall 42 has an outwardly protruding axial pin 43 adapted to be rotatably carried by a lateral endless chain 44. Each chain 44 is supported by sprockets 45 so as to follow a descending zig-zag path within the final drying chamber 2. The last or outlet chain-supporting sprocket 145 is situated outside of chamber 2, on the right-hand side thereof in FIG. 1, so as to determine a discharging station 46 for cages 38. From this outlet sprockets 145 chains 44 return horizontally through chamber 2 and reach the returning sprockets 245 situated outside of chamber 2 on the left hand side thereof in FIG. 1. From these returning sprockets 245 they are returned by intermediate sprockets 345 and 445 towards the inlet chain-supporting sprockets 545 which are situated below the discharging station 22 to determine the loading station 47 of the cages. Of course, chains 44 may be supported within chamber 2 by appropriate rails (not illustrated) in order to be maintained at the horizontal position. To one of the end walls 42 of each cage 38 is fixed a toothed gear 48 (FIG. 10) adapted to cooperate with lateral racks 49 (FIG. 11) secured against the inner walls of chamber 2. It will easily be grasped that the linear movement of cages 38 under the action of chains 44 thus causes rotation of the latter about their own axes. The other end of each cage 38 has a T-shaped outer rib comprising a diametral portion 50 (FIG. 10) corresponding to the bar of the T and a radial portion 51 perpendicular to portion 50 to form the limb thereof. The three ends of this T-shaped rib 50–51 are in the form of gear teeth to cooperate with stationary abutments 52 (FIG. 11) or 152 (FIG. 12) respectively provided at the discharging and at the loading station.

Chains 44 are driven by the general motor 16 which drives the chain 12 of the pre-drying chamber 1, but at a much lower speed, this being obtained by a speed-reducing gearing 53 interposed between motor 16 and the sprockets 245 of chains 44. As in the case of the pre-drying chamber, sprockets 35 may be mounted on shafts protruding through the lateral walls of the chamber and connected with each other by any appropriate means. In any case the arrangement is such that each time a pre-drying screen 3 stops at the discharging station 22, as above explained, a cage 38 stops under the latter to receive the pre-dried products which fall therefrom under the action of brush 24. At the same time another cage 38 stops at the discharging station 46. Of course the cage 38 which receives the pre-dried products should stand with its cover 39 at the open position and with its opening facing upwardly, while at the discharging station the cage should also have its cover open, but with its opening facing downwardly.

The mechanism which insures the unloading of the successive cages 38 at the discharging station 46 will first be described with reference to FIG. 11. As illustrated the last rack 49 terminates at a distance from the three stationary abutments 52. Considering a given cage, when its toothed gear 48 disengages from rack 49 its T-shaped rib 50–51 may be at any position about the longitudinal axis of the cage. It may occur that the limb of the T be exactly vertical and directed downwardly (which position may be termed "normal" position of the rib) and abutments 52 are so located that in such a case they merely slide on the upper side of the horizontal bar of the T without causing rotation of the cage. If such is not the case, abutments 52 will act on one at least of the three branches of the rib and it is easily ascertained that whatever may be the initial position of the said rib, same will be positively brought to the above-mentioned "normal" position for which the limb of the T is vertical and pointing downwardly. In other words abutments 52 form a pegged rack while rib 50–51 may be considered as a four-toothed pegged wheel in which one tooth would have been suppressed. The arrangement of cages 38 is such that when the T-shaped rib 50–51 is at this "normal" position, the opening of the cage is facing upwardly.

The upper side of the T-shaped rib of the cage which has passed in front of abutments 52 engages a cam surface 54a formed by the inner side of a member 54 which surrounds the outlet sprockets 145, while the protruding ends 40a of the rod 40 secured to the free edge of the cover 39 of the cage engage the outer side or cam surface 54b of member 54. The inner cam surface 54a maintains the limb 51 of the T-shaped rib 50–51 perpendicular to the chains 44, i.e., directed towards the axis of sprockets 145, while the outer cam surface 54b progressively opens cover 39 against its biassing or returning spring. It results therefrom that when the cage 38 has rotated through 180° around sprockets 145, its opening faces downwardly with its cover 39 fully open. The dried products therefore fall onto an appropriate receiving member 55 which may be in the form of a conveyor whereby they are led towards a packaging station.

The outer cam surface 54b thereafter permits cover 39 to close under the action of its biassing spring.

It may be of course of advantage to provide cam surfaces 54b on both sides of the drier in order to act on both ends of the rod 40 of successive cages 38.

The mechanism which acts on cages 38 at the inlet or loading station 47 of the final drying chamber 2, i.e., under the discharging station 22 of the pre-drying screens 3, is quite similar to that described with reference to FIG. 11. It has been very diagrammatically shown in FIG. 12. Three successive abutments 140 bring the successive cages 38 at a position for which the limb 51 of their T-shaped rib 50–51 is pointing towards the right. The inner side of an appropriate member 154 forms a cam surface 154a to act on the transverse branch 50 of the T, as cam surface 54a in FIG. 11, while its outer side forms another cam surface 154b which, as cam surface 64b of FIG. 11, opens the cover 39 of the successive cages 38 in order that they may receive the pre-dried products brushed from the pre-drying screens 3.

I claim:

1. A drying apparatus for macaroni and like elongated paste products cut to a predetermined length, comprising a number of substantially flat movable pre-drying screens to support the products to be dried; loading means to load said screens in succession with the products to be dried in the form of substantially uniform layers; a pre-drying chamber having an inlet and an outlet, and through which said screens pass in succession with said layers thereon; means to displace said screens through said pre-drying chamber between the inlet and the outlet thereof substantially transversely with respect to the products which they support; a number of substantially cylindrical elongated perforated drying cages to receive said products in the pre-dried state from said screens; transferring means to successively transfer said pre-dried products from each of said screens after same has passed through said pre-drying chamber into one of said elongated cages, with said pre-dried products being disposed longitudinally of said one of said cages; a final drying chamber having an inlet and an outlet, and through which said cages pass in succession with said pre-dried products thereon; means to displace said cages within said final drying chamber between the inlet and the outlet thereof, while causing said cages to roll on themselves; and discharging means to successively discharge said products from said cages in the finally dried state, when said cages have passed through said final drying chamber.

2. In a drying apparatus as claimed in claim 1, said pre-drying chamber having two substantially parallel lateral walls; said walls carrying a number of superposed substantially horizontal pairs or rails within said pre-drying chamber; each of said screens having a number of lateral rollers to roll on said rails; said means to displace said screens being in the form of two first endless chains; each of said screens being disposed between said first endless chains and being pivotally attached thereto; said first endless chains moving within said pre-drying chamber along the lateral walls thereof and between the inlet and the outlet thereof to drive said screens along a zig-zag path by rolling alternately on one pair of rails in one direction and on the next pair of rails in the other direction; and said rails being interrupted for passage of the rollers of said screens when same pass from one pair of rails to the next one.

3. In a drying apparatus as claimed in claim 1, each of said cages having a longitudinal axis and being formed with an opening extending substantially along the full length of the cage; each of said cages comprising a cover hinged about an axis substantially parallel to the axis of the cage, said cover being arcuate in cross-section to conform with the circular contour of the cage, and spring means to urge said cover to the closed position; said means to displace said cages and to cause same to rotate on themselves comprising two second endless chains, each of said cages being disposed between said second endless chains and being pivotally attached thereto substantially along the longitudinal axis of the cage, stationary racks within said final drying chamber, and a pinion rigidly secured to each of said cages to mesh with said racks; means being provided adjacent the inlet of said final drying chamber to open the cover of the successive cages with the opening of each cage facing upwardly to receive the pre-dried products from said pre-drying screens; and means being provided adjacent the outlet of said final drying chamber to open the cover of the successive cages with the opening of each cage facing downwardly to discharge the finally dried products from said cages.

4. In a drying apparatus as claimed in claim 3, said means to open the covers of said cages adjacent the inlet of said final drying chamber and said means to open the covers of said cages adjacent the outlet of said final drying chamber each comprising a T-shaped star-wheel rigidly secured to each cage, substantially coaxially thereto, said star-wheel comprising a transverse bar and a radial branch perpendicular thereto; three stationary abutments to act on the star-wheels of the successive cages to bring said star-wheels to a predetermined orientation about their longitudinal axis with the upper bar of the T substantially parallel to the movement of the cages; a first stationary cam surface acting on the upper bar of the T to maintain the star-wheels of each of the successive cages at said predetermined orientation while the cover thereof is opened; a lateral projection rigid with the cover of each successive cage; and a second stationary cam surface to act on the lateral projection of the cover of each successive cage to momentarily open said cover against said spring means.

5. A drying apparatus as claimed in claim 1, comprising a screen-loading station at which said pre-drying screens receive the products to be dried from said loading means; a screen-discharging station at which the pre-dried products are discharged from said screens by said transferring means; a cage loading station at which said perforated cages receive the pre-dried products from said transferring means, said cage loading station being disposed below said screen discharging station; a cage discharging station at which the finally dried products are discharged from said cages by said discharging means; and means to momentarily stop said screen driving means and said cage driving means with one of said screens being at said screen loading station and with another of said screens at said screens discharging station, said screen driving means and said cage driving means being so timed with respect to each other that one of said cages then is at said cage loading station and another of said cages at said cage discharging station.

6. In a drying apparatus as claimed in claim 1, said transferring means comprising a brushing member movable with respect to the successive screens supporting the pre-dried products, substantially longitudinally with respect to the direction of movement of the screens, to sweep the pre-dried products from each of said screens into one of said cages disposed below said each of said screens.

References Cited
UNITED STATES PATENTS

| | | | |
|---|---|---|---|
| 1,551,818 | 9/1925 | Garnsey | 34—25 |
| 1,634,009 | 6/1927 | Bagnani | 34—203 |
| 2,074,458 | 3/1937 | Cavagnaro | 34—203 X |
| 2,466,130 | 4/1949 | Surico | 34—25 X |
| 2,515,684 | 7/1950 | Ambrette | 34—203 X |
| 3,094,398 | 6/1963 | Samson | 34—203 X |

FREDERICK L. MATTESON, JR., *Primary Examiner.*

C. R. REMKE, *Assistant Examiner.*